(12) United States Patent
Pantow

(10) Patent No.: US 7,603,968 B2
(45) Date of Patent: Oct. 20, 2009

(54) COOLING SYSTEM

(75) Inventor: Eberhard Pantow, Möglingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 9 days.

(21) Appl. No.: 11/578,116

(22) PCT Filed: Mar. 17, 2005

(86) PCT No.: PCT/EP2005/002816

§ 371 (c)(1),
(2), (4) Date: Oct. 10, 2006

(87) PCT Pub. No.: WO2005/100760

PCT Pub. Date: Oct. 27, 2005

(65) Prior Publication Data
US 2007/0209613 A1    Sep. 13, 2007

(30) Foreign Application Priority Data
Apr. 8, 2004   (DE) .................. 10 2004 018 036

(51) Int. Cl.
*F01P 5/06*   (2006.01)
(52) U.S. Cl. .............. 123/41.04; 123/41.49; 123/41.56
(58) Field of Classification Search .............. 123/25 Q,
123/41.01, 41.04, 41.11, 41.49, 41.63, 41.65,
123/41.3, 41.48, 41.56, 41.6, 41.62, 41.7
See application file for complete search history.

(56) References Cited

U.S. PATENT DOCUMENTS

| | | | |
|---|---|---|---|
| 2,146,501 A * | 2/1939 | Flautt ................... 123/41.04 |
| 4,691,668 A * | 9/1987 | West ..................... 123/41.12 |
| 4,723,594 A * | 2/1988 | Koehr et al. ............ 165/44 |
| 4,756,279 A | 7/1988 | Temmesfeld |
| 5,046,550 A * | 9/1991 | Boll et al. ................ 165/41 |
| 5,302,147 A * | 4/1994 | Oishi .................... 440/77 |
| 5,427,502 A | 6/1995 | Hudson |
| 5,970,925 A | 10/1999 | Lakerdas et al. |
| 6,106,228 A * | 8/2000 | Bartlett .................. 415/146 |
| 6,532,909 B2 * | 3/2003 | Stauder et al. .......... 123/41.04 |
| 6,648,939 B2 * | 11/2003 | Neuschwander et al. ...... 55/423 |
| 6,668,956 B1 | 12/2003 | Pelage et al. |
| 2003/0056502 A1* | 3/2003 | Katayama et al. ........... 60/313 |

(Continued)

FOREIGN PATENT DOCUMENTS

DE    34 46 950 C1    5/1986

(Continued)

*Primary Examiner*—Hai H Huynh
(74) *Attorney, Agent, or Firm*—Foley & Lardner LLP

(57) ABSTRACT

The invention relates to a cooling system for a motor vehicle comprising a radiator (1) through which a coolant for, in particular, cooling an engine (2) flows, and which is flowed through by a cooling air flow (7) that is influenced by a fan (4) according to the velocity of the motor vehicle. Said fan is situated between the radiator (1) and the engine (2). The projection of the fan surface toward the radiator surface is smaller than the radiator surface by a difference area, whereby this difference area of the cooler surface is covered by a fan cowl (25). In order to create cooling system that is improved with regard to aerodynamics, the fan cowl (25) is provided with at least one opening (27) on at least one side of the difference area.

16 Claims, 6 Drawing Sheets

U.S. PATENT DOCUMENTS

| | | | |
|---|---|---|---|
| 2003/0145809 A1* | 8/2003 | Janhunen | 123/65 VD |
| 2003/0183446 A1 | 10/2003 | Shah et al. | |
| 2007/0060037 A1* | 3/2007 | Kim et al. | 454/230 |
| 2007/0119395 A1* | 5/2007 | Nagano et al. | 123/41.65 |
| 2008/0017138 A1* | 1/2008 | Rogg | 123/41.05 |

FOREIGN PATENT DOCUMENTS

| | | |
|---|---|---|
| DE | 102 57 838 A1 | 7/2004 |
| FR | 2 816 360 A1 | 5/2002 |
| JP | 57-173519 A | 10/1982 |
| WO | WO 98/37319 A1 | 8/1998 |

* cited by examiner

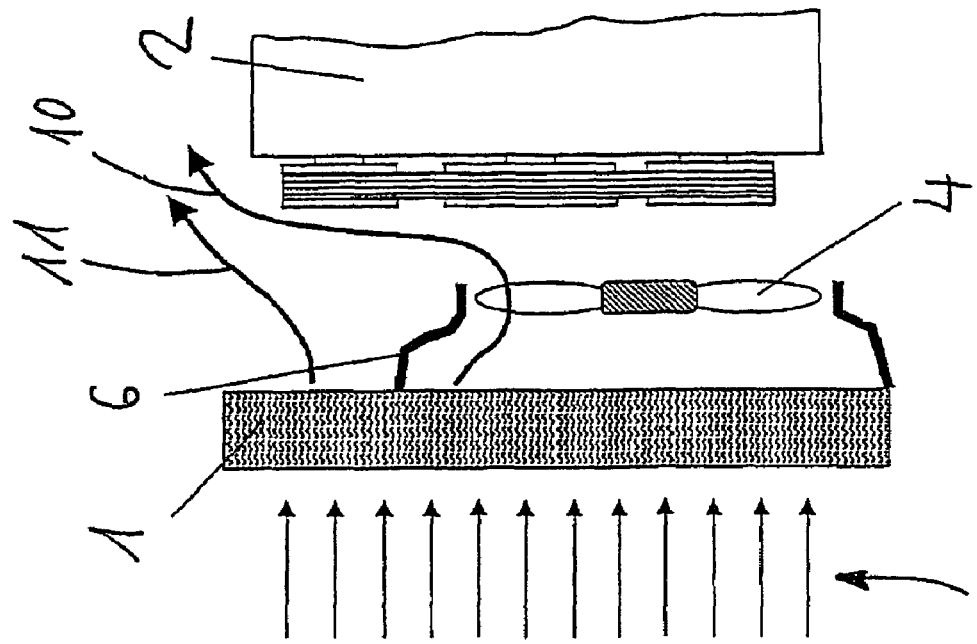
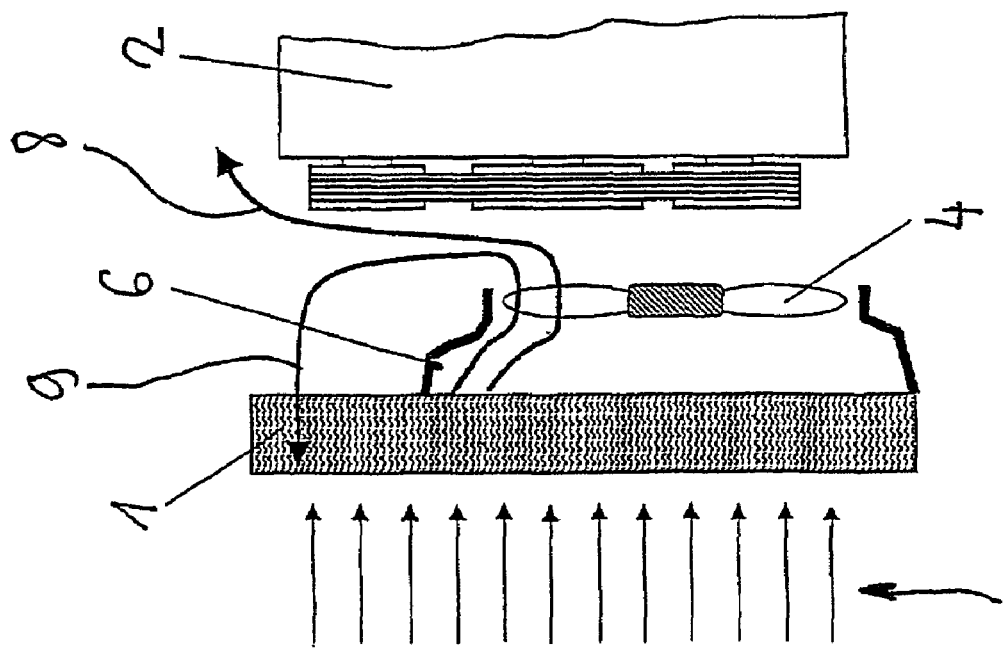

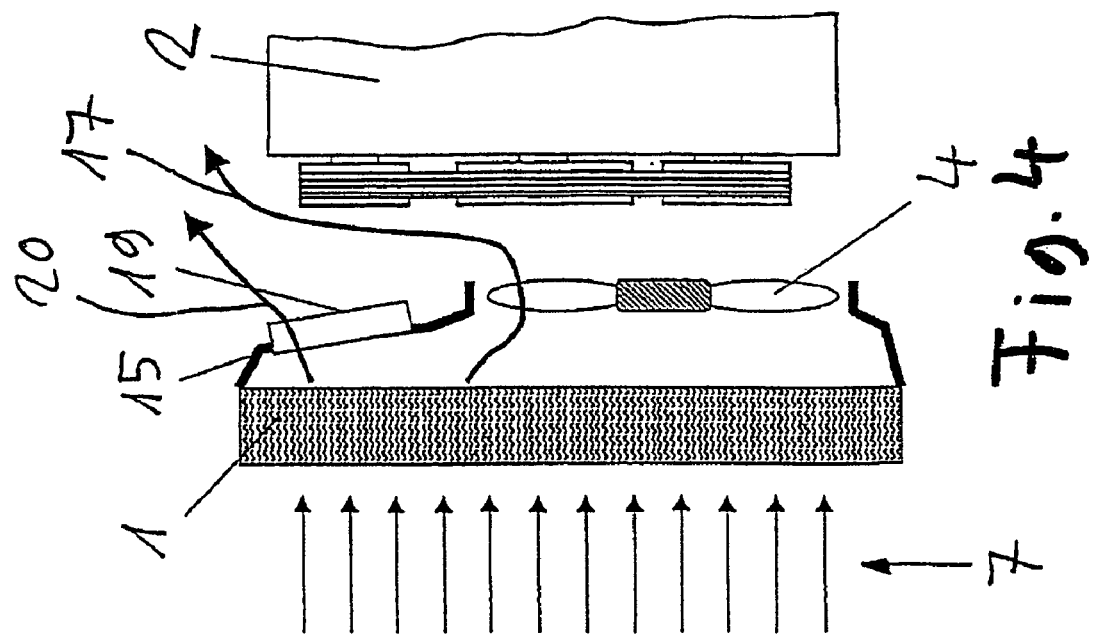
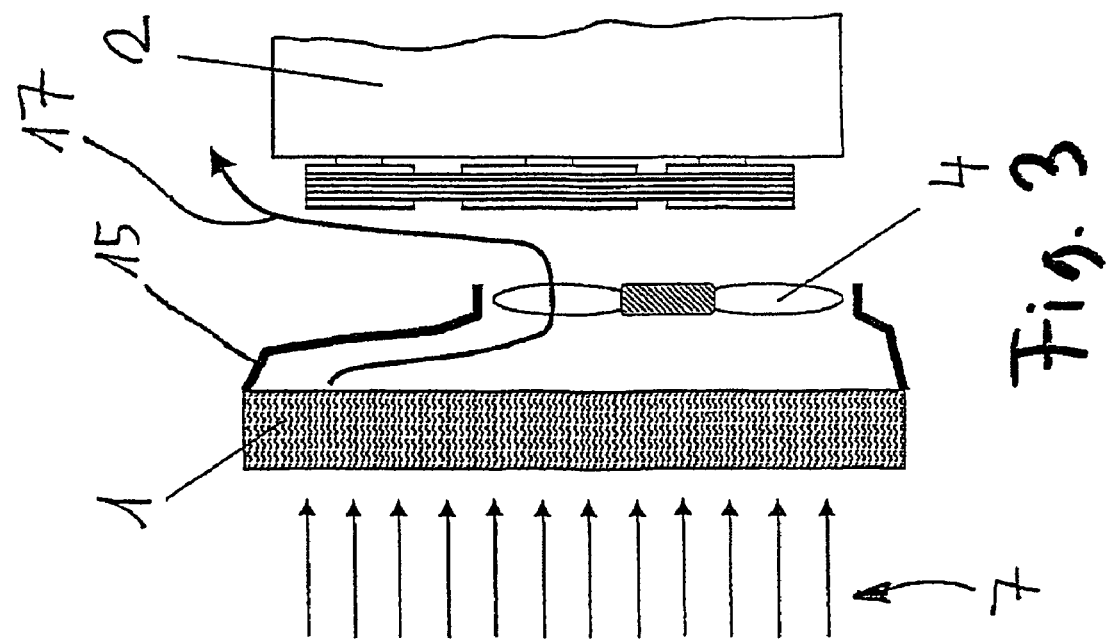

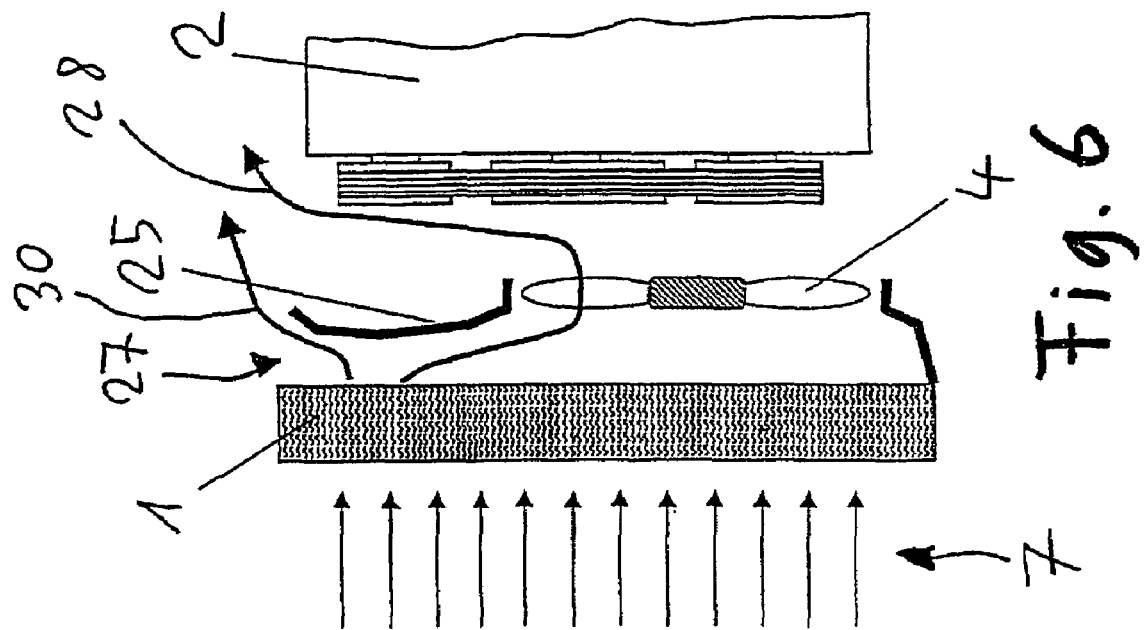
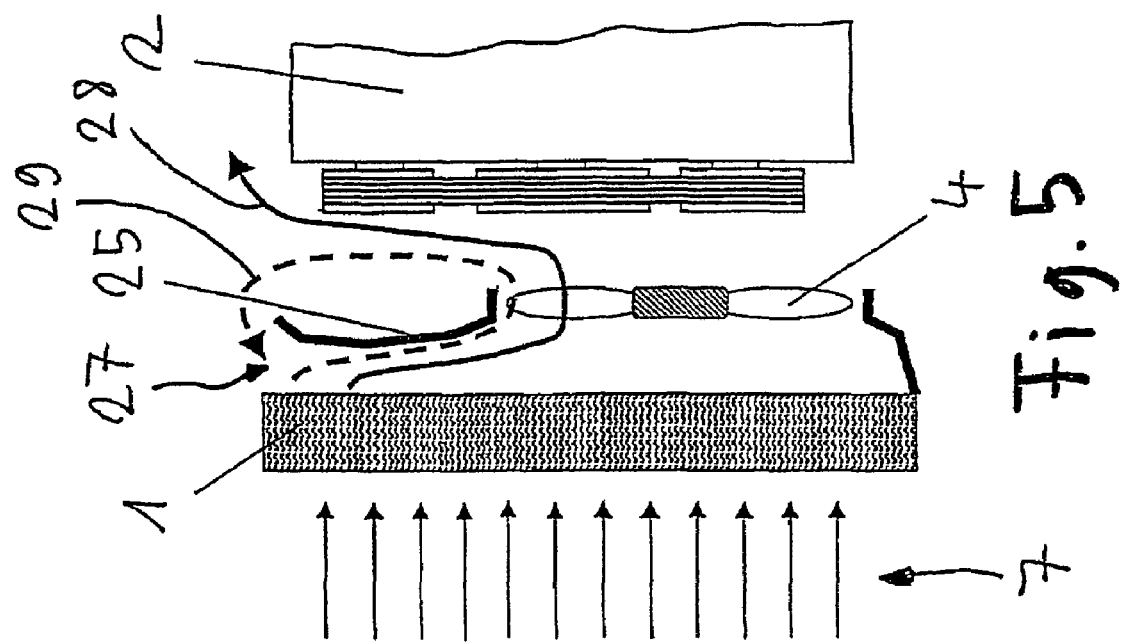

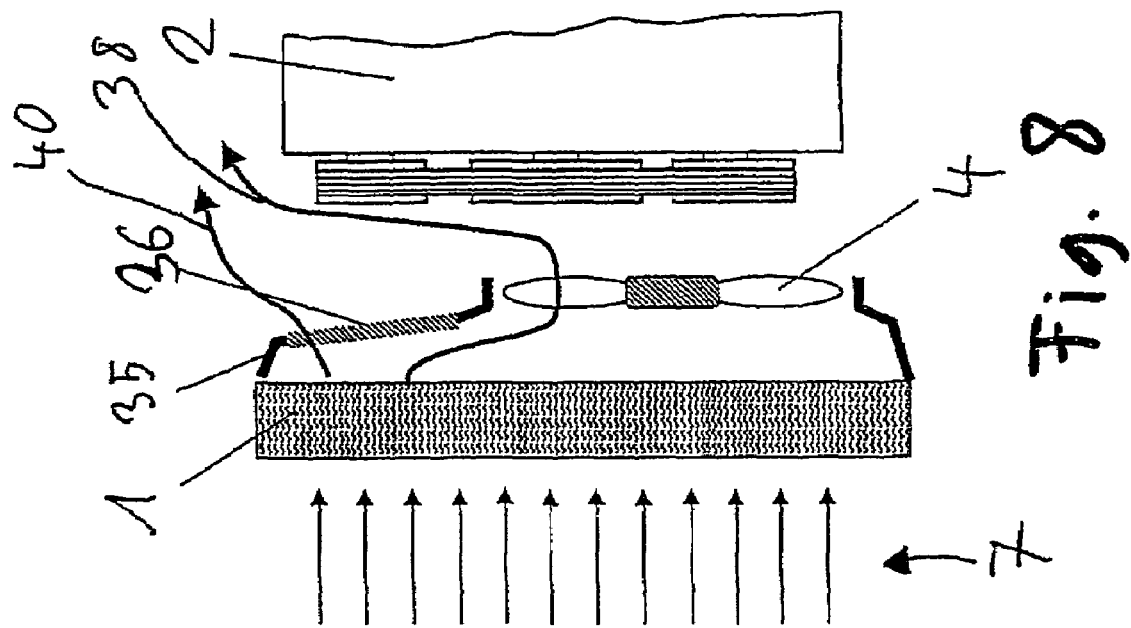
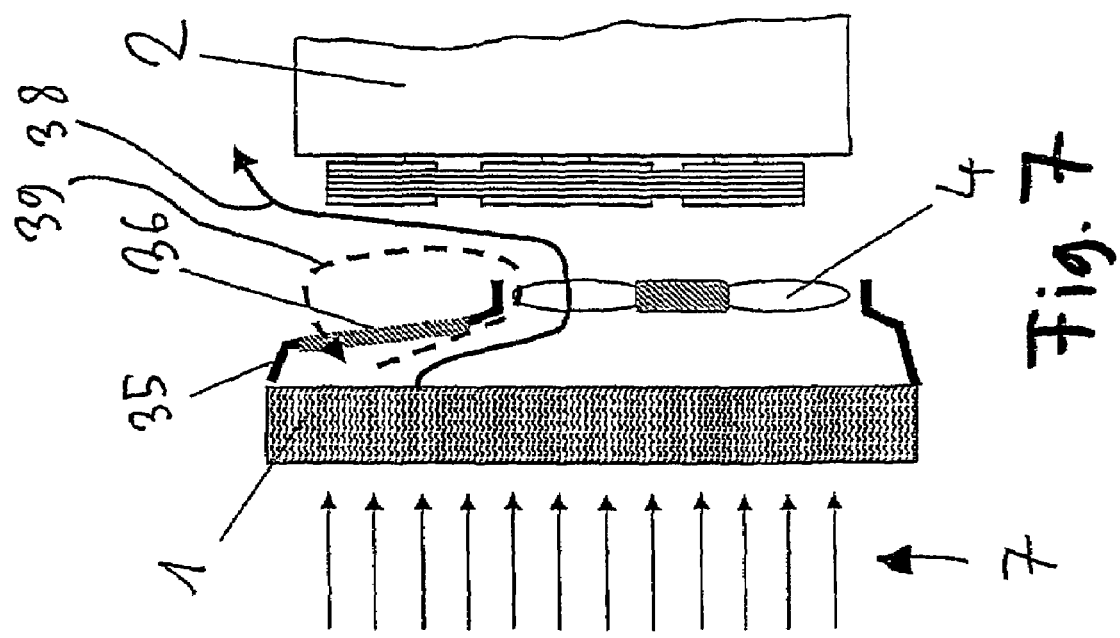

COOLING SYSTEM

The invention relates to a cooling system for a motor vehicle, having a radiator through which a coolant flows, said coolant serving, in particular, for cooling an engine, and through which flows a cooling air stream which is influenced, as a function of the speed of the motor vehicle, by a fan which is arranged between the radiator and the engine, the projection of the fan surface onto the radiator surface being smaller, by a differential area, than the radiator surface and the differential area of the radiator surface being covered by a fan cowling.

In such cooling systems, the fan, which is also referred to as a cooling fan, has the function of supplying the radiator and the engine compartment with a sufficient cooling air flow rate if the slip stream is not sufficient, for example, when traveling slowly or when the vehicle is stationary. The necessary delivery volume of the fan varies greatly depending on the operating state of the vehicle. When the vehicle is traveling slowly, the build up of pressure it is necessary to deliver to the cooling air stream is made available by the fan. For this reason, this operating state is also referred to as the fan operating state, or fan mode for short. When the vehicle is traveling quickly, the slip stream has a greater effect than the fan. The fan leads to an undesired loss of pressure when the vehicle is traveling quickly. This operating state is also referred to as the ram pressure operating state, or ram pressure mode for short. The pressure loss which occurs in the ram pressure mode is problematic in particular if the projection of the fan surface onto the radiator surface is significantly smaller than the radiator surface itself.

The object of the invention is to provide an aerodynamically improved cooling system for a motor vehicle, having a radiator through which a coolant flows, said coolant serving, in particular, for cooling an engine, and through which flows a cooling air stream which is influenced, as a function of the speed of the motor vehicle, by a fan which is arranged between the radiator and the engine, the projection of the fan surface onto the radiator surface being smaller, by a differential area, than the radiator surface and the differential area of the radiator surface being covered by a fan cowling, which is suitable both for high speed travel which is dominated by ram pressure and for the fan mode when traveling slowly.

The object is achieved in a cooling system for a motor vehicle, having a radiator through which a coolant flows, said coolant serving, in particular, for cooling an engine, and through which flows a cooling air stream which is influenced, as a function of the speed of the motor vehicle, by a fan which is arranged between the radiator and the engine, the projection of the fan surface onto the radiator surface being smaller, by a differential area, than the radiator surface and the differential area of the radiator surface being covered by a fan cowling, in that the fan cowling is provided with at least one opening on one side, in particular on at least one side of the differential area. As a result, the fan cowling is, in the areas which are not covered by the fan or by a fan frame ring which is preferably provided on the circumference of the fan, configured aerodynamically in such a way that the pressure drop in the cooling air which flows through the radiator from the front is significantly less than the pressure drop in the cooling air which flows from the fan through the fan cowling in the direction of travel at a low ram pressure. This flow is not prevented by a fan cowling contour which follows the desired flow through the engine cavity in the ram pressure mode. In the fan mode, the flow must take a longer path and be diverted more in order to be able to recirculate. As a result, the pressure loss on this flow path increases considerably so that the proportion of the recirculated air is reduced.

A preferred exemplary embodiment of the cooling system is characterized in that the opening widens outward toward the engine when considered in section. This widening of the flow path has proven particularly advantageous within the scope of the present invention.

The object specified above is also achieved in a cooling system for a motor vehicle, having a radiator through which a coolant flows, said coolant serving, in particular, for cooling an engine, and through which flows a cooling air stream which is influenced, as a function of the speed of the motor vehicle, by a fan which is arranged between the radiator and the engine, the projection of the fan surface onto the radiator surface being smaller, by a differential area, than the radiator surface and the differential area of the radiator surface being covered by a fan cowling, in that the fan cowling has an opening, in particular at least one opening in the differential area toward the engine, in which opening at least one guide lamella, in particular a plurality of guide lamellas, is or are arranged. As a result, in the areas which are not covered by the fan or by a fan frame ring which is preferably provided on the circumference of the fan, the fan cowling is configured aerodynamically in such a way that the pressure drop in the cooling air which flows through the cooler from the front is significantly lower than the pressure drop of the cooling air which flows from the fan in the direction of travel through the fan cowling to the front when the ram pressure is low. The guide lamella presents different resistances as a result of its shape and owing to the various flow directions and flow angles for the flow shapes which vary as a function of the speed of the vehicle.

A preferred exemplary embodiment of the cooling system is characterized in that a plurality of guide lamellas are arranged essentially parallel to one another in the form of a guide grill. The guide grill is preferably oriented in such a way that the flow through it in the ram pressure mode is promoted and the recirculation is prevented.

A further preferred exemplary embodiment of the cooling system is characterized in that the guide lamellas are arranged essentially concentrically to the fan axis considered in the plan view onto the radiator. This arrangement of the guide lamellas has proven particularly advantageous within the scope of the present invention.

A further preferred exemplary embodiment of the cooling system is characterized in that the guide lamellas are arranged inclined at an angle of 30° to 80°, in particular of approximately 45°, with respect to the cooling air stream. This arrangement of the guide lamellas with respect to the main direction of the cooling air stream has proven particularly advantageous within the scope of the present invention.

A further preferred exemplary embodiment of the cooling system is characterized in that the guide lamellas are of bent design, viewed in section. This permits better adaptation to the flow conditions.

A further preferred exemplary embodiment of the cooling system is characterized in that the guide lamellas are convexly curved towards the fan. The guide lamellas are preferably of curved design.

A further preferred exemplary embodiment of the cooling system is characterized in that the guide lamellas are of contoured design. The guide lamellas are preferably arranged distributed uniformly in the guide grill. The guide lamellas can however also be arranged distributed nonuniformly.

A further preferred exemplary embodiment of the invention is characterized in that the fan cowling is formed in one piece from plastic. In order to avoid high costs, the fan cowling is preferably embodied as an injection molded part, with the individual grill elements being configured in such a way that they do not overlap in a direction perpendicular with respect to the radiator and can thus be removed from the mold with a simple injection molding tool.

Within the scope of the present invention various approaches have been considered, for example the use of so called partial frames or of full frames, for achieving the object specified above. These approaches are explained in more detail in the following detailed description of the figures. The solution according to the invention generally provides the advantage that it is possible to dispense with moving parts such as ram pressure flaps on the fan cowling. Nevertheless it is ensured that there is a flow through the entire radiator surface in the fan mode. Undesired back flow can be very largely prevented.

Further advantages, features and details of the invention can be found in the following description in which various exemplary embodiments are described in detail with reference to the drawing, in which:

FIG. 1 shows a cooling system with so called partial frames in the fan mode;

FIG. 2 shows the cooling system from FIG. 1 in the ram pressure mode;

FIG. 3 shows a cooling system with so called full frames in the fan mode;

FIG. 4 shows the cooling system from FIG. 3 in the ram pressure mode;

FIG. 5 shows a cooling system according to the invention with a lateral opening in the fan mode;

FIG. 6 shows the cooling system from FIG. 5 in the ram pressure mode;

FIG. 7 shows a cooling system according to the invention with a guide lamella in the fan mode;

FIG. 8 shows the cooling system from FIG. 7 in the ram pressure mode;

Figure 9:
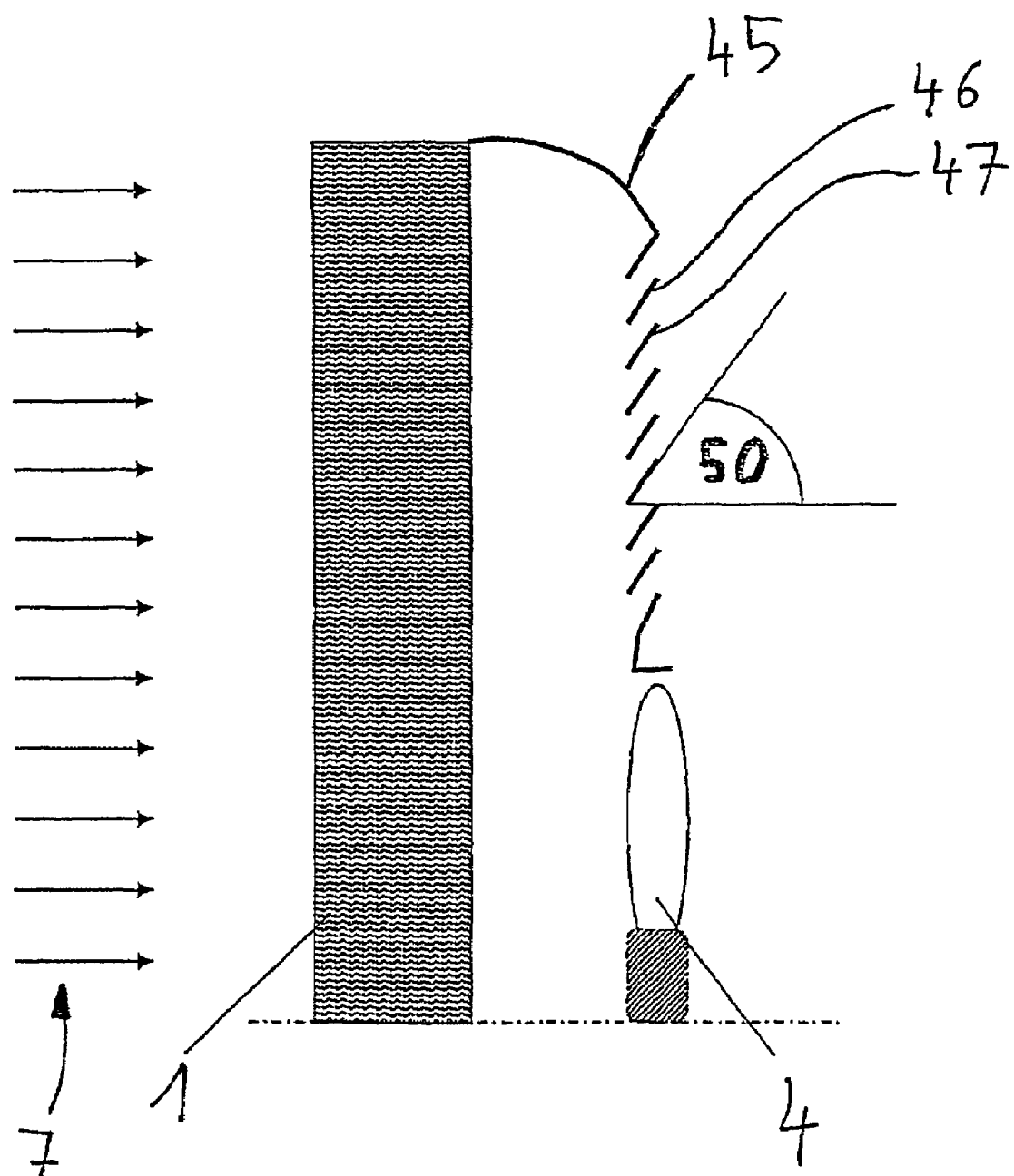
FIG. 9 shows a detail of a cooling system according to the invention with a guide grill according to a first embodiment.

FIG. 1 is a schematic illustration of a cooling system with so called partial frames. The cooling system comprises a radiator 1 through which a coolant flows, said coolant being directed via coolant lines (not illustrated) to an engine 2 and being used there to cool the engine 2. Arranged between the radiator 1 and the engine 2 is a fan 4 which, in particular when the vehicle is stationary or when it is traveling slowly, serves to cause a sufficient cooling air flow rate to pass through the engine compartment. The state illustrated in FIG. 1 is therefore also referred to as fan mode. The fan is surrounded by an enclosed fan cowling 6.

A cooling air stream which is considered in the direction of travel of the motor vehicle and impacts on the radiator 1 from the front is designated in its entirety by 7. Since only the area of the fan 4 is covered by the enclosed fan cowling 6, the fan 4 feeds air only in a limited area. The cooling air stream 7 can flow unimpeded through the area of the radiator 1 which is not covered by the fan cowling 6. The desired flow path through the fan cowling 6 and the fan 4 is indicated by an arrow 8. An arrow 9 indicates that the cooling air can be recirculated through the radiator 1, in particular when a strong fan is used. Such recirculation leads to considerable losses in the cooling capacity when traveling slowly in the fan mode. Furthermore, only part of the radiator 1 is used in the fan mode, as a result of which the cooling capacity and also the air conditioning performance are degraded.

In the ram pressure mode illustrated in FIG. 2, that is to say when traveling at high speed, the air in the area which is not covered by the fan cowling 6 can flow almost unimpeded through the radiator 1, as indicated by an arrow 11. The throttling effect is thus limited to the area covered by the fan, as indicated by the arrow 10.

In FIGS. 3 to 8, the same reference symbols as in FIGS. 1 to 2 have been used for the radiator 1, the engine 2, the fan 4 and the cooling air stream 7. In order to avoid repetitions, reference is made to the preceding description of FIGS. 1 to 2. In the text which follows, details will be given only on the differences between the individual exemplary embodiments.

In the full frames illustrated in FIGS. 3 and 4, the entire surface of the radiator 1 is covered by a fan cowling 15. An arrow 7 indicates that the entire cooling air stream 17 in the fan mode illustrated in FIG. 3 is directed through the fan cowling 15 and through the fan 4.

In FIG. 4 it is apparent that in the ram pressure mode ram pressure flaps 19 clear openings, closed in the fan mode, for part of the cooling air stream 17, as is indicated by an arrow 20. The ram pressure flaps 19 have the function of a nonreturn valve, that is to say they open when the slip stream exceeds the pressure build up of the fan 4, and close when the fan 4 builds up more pressure behind the fan cowling 15 than the slip stream. The ram pressure flaps 19 constitute a considerable cost factor. The area which can be cleared for the ram pressure mode is furthermore limited structurally or by the manufacturing costs.

In FIGS. 5 and 6, the entire surface of the radiator 1 facing the engine 2 is covered, with the exception of the fan 4, by a fan cowling 25, as in the cooling system illustrated in FIGS. 3 and 4. However, an opening 27 through which the air can both enter and exit is provided laterally. The opening 27 widens outward. The opening 27 preferably extends over an entire side of the essentially rectangular radiator 1. An arrow 28 indicates that in the fan mode virtually the entire cooling air stream 7 passes along the desired flow path. A dashed arrow 29 indicates that a small part of the cooling air stream 7 can recirculate by first being able to flow through the radiator 1 and the fan 4 and then back into and through the radiator 1 via the opening 27. However, the flow path 29 is significantly longer than in conventional cooling systems. An arrow 30 in FIG. 6 indicates that part of the cooling air stream 7 flows through the radiator 1 and then through the opening 27.

In the FIGS. 7 and 8, the entire surface of the radiator facing the engine 2 is covered, with the exception of the fan 4, by a fan cowling 35. Openings or one large opening with fixed guide lamellas 36 are provided in the fan cowling 35 in the area in which the fan 4 is not arranged. An arrow 38 indicates that the main part of the cooling air stream 7 passes along the desired flow path through the fan and past the engine 2. The dashed arrow 39 in FIG. 7 indicates that a small part of the cooling air stream 7 can also recirculate. However, the recirculation flow path 39 is longer and provided with more diversions than in conventional cooling systems. This increases the pressure loss on this air path considerably. In FIG. 8, an arrow 40 indicates that part of the cooling air stream 7 passes through the opening with the guide lamella 36 and along the desired flow path past the engine 2.

FIG. 9 illustrates that a fan cowling 45 has an opening which is arranged radially outside the fan 4 and in which a plurality of guide lamellas 46, 47 are spaced apart from one another uniformly. The guide lamellas 46, 47 are arranged at an angle 50 of approximately 55° with respect to the main flow direction of the cooling air stream 7.

Figure 10:
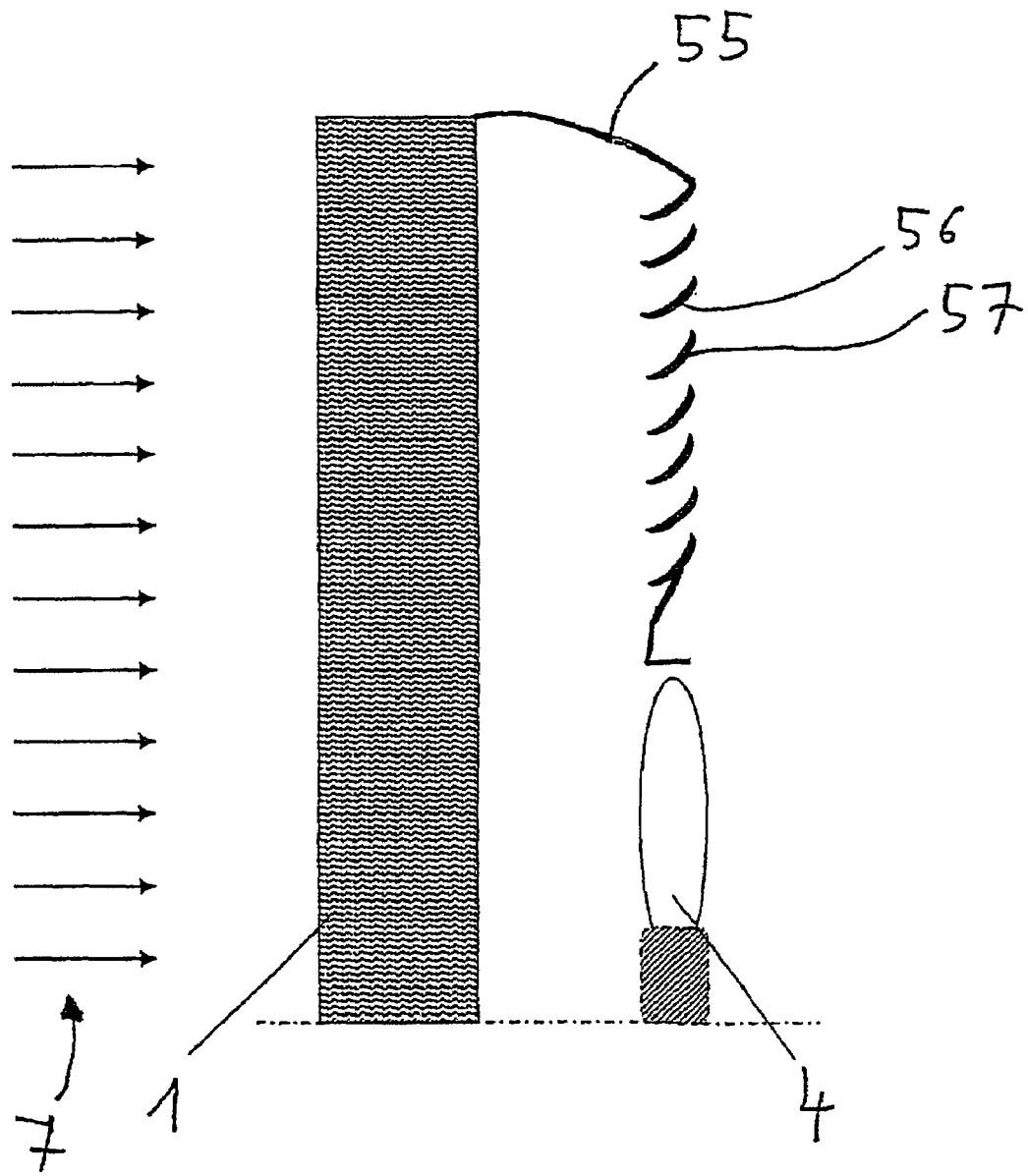
FIG. 10 shows a similar detail to FIG. 9 with a guide grill according to a second embodiment.

FIG. 10 illustrates a similar cooling system to that in FIG. 9. However, in the exemplary embodiment illustrated in FIG.

a plurality of bent guide lamellas 56, 57 are provided in a fan cowling 55. The guide lamellas 55, 56 are curved toward the fan 4. This results in a favorable flow profile, in particular in the ram pressure mode.

The invention claimed is:

1. A cooling system for a motor vehicle, comprising:
   a radiator through which a coolant flows for cooling an engine, and through which flows a cooling air stream,
   a fan configured to be arranged between the radiator and the engine,
   a fan cowling configured to cover at least a portion of a surface of the radiator, wherein the fan cowling includes a first opening and at least a second opening,
   wherein the first opening is configured to direct at least a portion of the cooling air stream through the fan,
   wherein the second opening is arranged to a lateral side of the radiator and is configured to direct at least a portion of the cooling air stream in a lateral direction so that the portion of the cooling air stream flowing through the second opening does not pass through the fan,
   wherein the second opening is located between the fan cowling and the radiator.

2. The cooling system as claimed in claim 1, wherein the second opening widens outward in a direction away from the radiator and toward the engine.

3. The cooling system as claimed in claim 1, wherein the fan cowling is formed in one piece from plastic.

4. The cooling system as claimed in claim 1, wherein the second opening is configured to recirculate back to the radiator at least some of the portion of the cooling air stream that flows through the first opening and the fan.

5. The cooling system as claimed in claim 1, wherein the fan is offset from a center of the radiator.

6. A cooling system for a motor vehicle, comprising:
   a radiator through which a coolant flows for cooling an engine, and through which flows a cooling air stream,
   a fan configured to be arranged between the radiator and the engine,
   a fan cowling that extends to the radiator and is configured to cover at least a portion of a surface of the radiator, wherein the fan cowling includes a first opening and at least a second opening,
   wherein the first opening is configured to direct at least a portion of the cooling air stream through the fan,
   wherein the second opening includes a plurality of guide lamellas arranged essentially parallel to one another in the form of a guiding grill in the second opening,
   wherein the guide lamellas are fixed,
   wherein the second opening is configured to recirculate back to the radiator at least some of the portion of the cooling air stream that flows through the first opening and the fan.

7. The cooling system as claimed in claim 6, wherein the guide lamellas are arranged essentially concentrically to an axis of the fan.

8. The cooling system as claimed in claim 6, wherein the guide lamellas are arranged inclined at an angle of 30° to 80° with respect to the cooling air stream.

9. The cooling system as claimed in claim 8, wherein the guide lamellas are arranged inclined at an angle of 45° with respect to the cooling air stream.

10. The cooling system as claimed in claim 6, wherein the guide lamellas are of bent design.

11. The cooling system as claimed in claim 10, wherein the guide lamellas are convexly curved towards the fan.

12. The cooling system as claimed in claim 6, wherein the guide lamellas are of contoured design.

13. The cooling system as claimed in claim 6, wherein the second opening is arranged to a lateral side of the radiator and is offset from the first opening, wherein the second opening is configured to direct at least a portion of the cooling air stream in a lateral direction so that the portion of the cooling air stream flowing through the second opening does not pass through the fan.

14. The cooling system as claimed in claim 6, wherein the second opening is arranged in a region located outside of an area of the radiator covered by the fan.

15. The cooling system as claimed in claim 6, wherein the fan is offset from a center of the radiator.

16. The cooling system as claimed in claim 6, wherein the fan cowling extends between the fan and the radiator.

\* \* \* \* \*